United States Patent

Yoshisato

[11] 4,172,995
[45] Oct. 30, 1979

[54] SSB TRANSCEIVER

[75] Inventor: Akiyuki Yoshisato, Soma, Japan

[73] Assignee: Alps Electric Co., Ltd., Japan

[21] Appl. No.: 826,407

[22] Filed: Aug. 22, 1977

[30] Foreign Application Priority Data

Aug. 20, 1976 [JP] Japan .................. 51-99512

[51] Int. Cl.² ............................... H04B 1/40
[52] U.S. Cl. .......................... 325/17; 325/64
[58] Field of Search .............. 325/17, 18, 21, 25, 325/49, 50, 63, 64, 55

[56] References Cited

U.S. PATENT DOCUMENTS

| | | | |
|---|---|---|---|
| 3,084,328 | 4/1963 | Groeneveld | 325/49 |
| 3,320,535 | 5/1967 | Broadhead, Jr. | 325/49 |
| 3,716,790 | 2/1973 | Romoser | 325/49 |
| 3,813,598 | 5/1974 | Stuart | 325/49 |
| 3,969,675 | 7/1976 | Gosling | 325/63 |
| 3,983,484 | 9/1976 | Hodama | 325/20 |
| 4,019,138 | 4/1977 | Watanabe | 325/63 |
| 4,061,973 | 12/1977 | Reimers | 325/17 |

Primary Examiner—Robert L. Griffin
Assistant Examiner—Michael A. Masinick
Attorney, Agent, or Firm—Guy W. Shoup; Gerard F. Dunne

[57] ABSTRACT

Two pilot signals transmitted at the beginning of transmission from a transmitting station are demodulated in the receiving station and one of the demodulated pilot signals is phase compared with a reference signal generated by the transceiver. A phase comparator generates a control signal having a voltage corresponding to the difference between the compared signals. The control signal is input to a local oscillator of the transceiver which generates a signal to automatically tune the transceiver to the incoming signal frequency.

11 Claims, 8 Drawing Figures

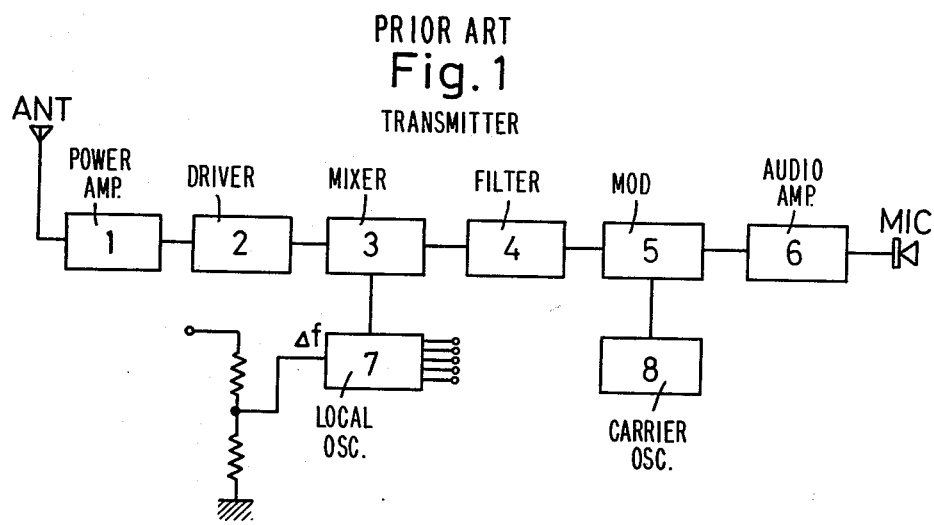
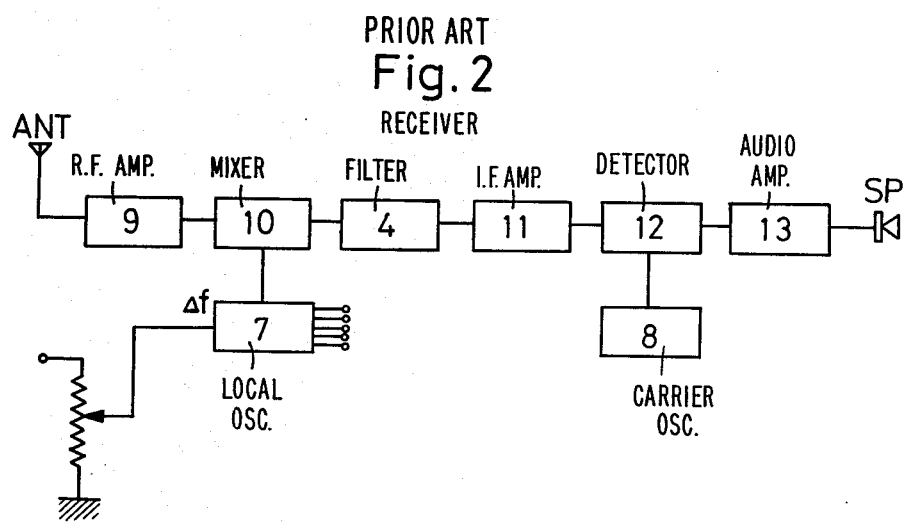

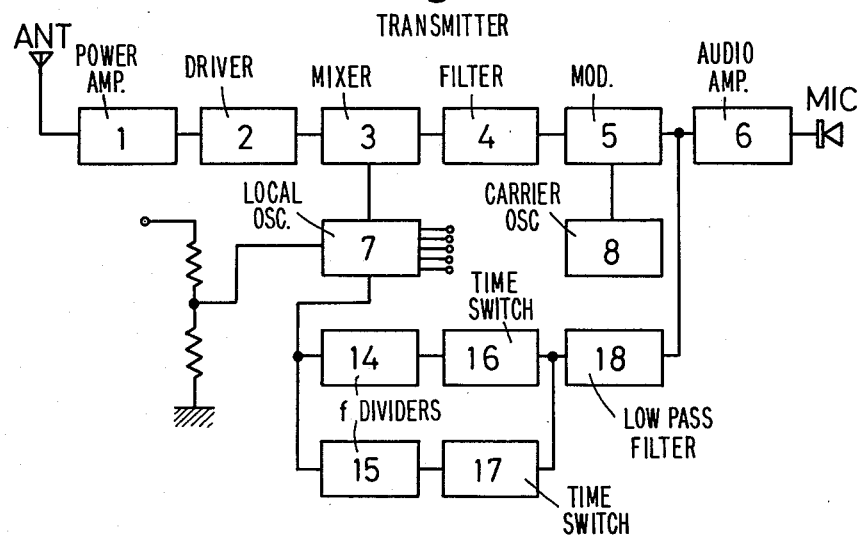
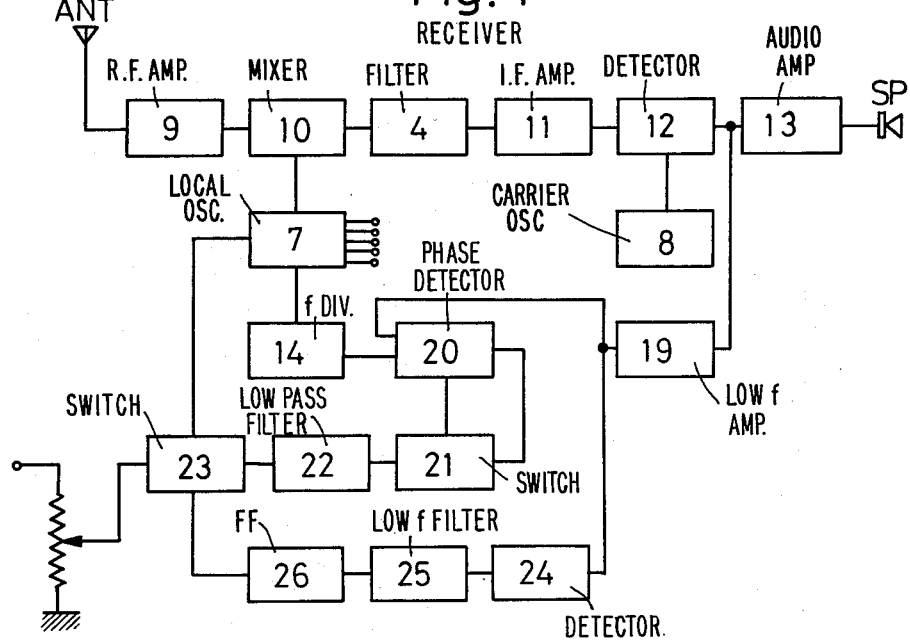

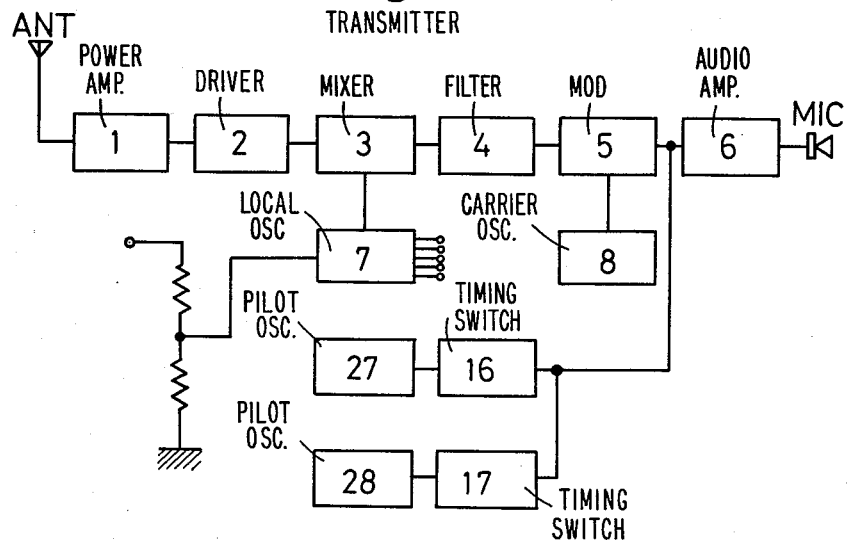
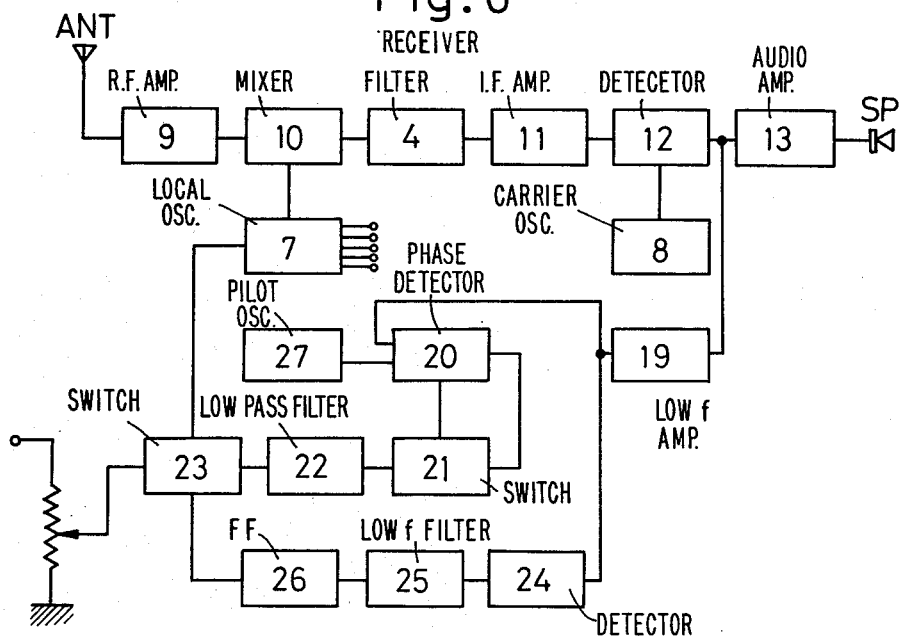

SSB TRANSCEIVER

BACKGROUND OF THE INVENTION

The present invention relates to an SSB (single side band) mode transceiver and, more particularly, to such a transceiver which can be automatically tuned to an incoming signal frequency.

The allowance of frequency deviation among wireless telecommunication stations is a very significant matter. For example, the frequency deviation which is demanded for a Class D station in citizen band is within ±0.0005%. This value is equal to ±1350 Hz on the CB frequency. In typical AM mode operation this allowance is not very important. However, in SSB mode this allowance should be held within a range of 50 to 100 Hz so that the telecommunication can be accomplished with a satisfactory readability. In order to accomplish SSB mode operation by a Class D station it is often necessary to tune the transceiver to the same frequency as the other station by means of a manual receiver frequency correction means often referred to as clarifier or fine tuner. It goes without saying that a channel selector must also be used.

A conventional SSB transceiver will be described with reference to FIGS. 1 and 2 which are schematic block diagrams respectively showing transmitter and receiver units of a conventional transceiver. When the transceiver is in the transmission mode, the audio signal from a microphone (MIC) is amplified by means of a speech amplifier 6. The amplified signal is fed to a balanced modulator in which it is converted into a carrier suppressed double side band (DSB) signal by modulating a carrier signal from a carrier oscillator 8. The DSB signal is then converted into a single side band signal after passing a crystal filter 4. The SSB signal is applied to a transmitter mixer 3 in which it is converted into a transmitting signal by being mixed with a signal from a local oscillator 7 comprising a phase locked loop type frequency synthesizer. The transmitting signal is power amplified through a driver 2 and a power amplifier 1 so that it may be transmitted from an antenna (ANT) at a desired power. The aforementioned carrier oscillator 8 is comprised of a quartz crystal oscillator which oscillates at a single frequency. The oscillator is also commonly used for generating a demodulating signal for the receiver unit. The PLL synthesizer 7 is adapted to synthesize desired frequencies by means of one or two crystal elements and the selection of a frequency is accomplished in a digital manner by means of a channel selection switch (not shown). When the transceiver is in a transmission mode, a constant biasing voltage is applied to the PLL synthesizer 7 through constant resistors, since the output frequency from the synthesizer 7 may be changed only when the transceiver is in the receiving mode.

In the receiving mode an incoming signal is amplified by radio frequency amplifier 9 and applied to a mixer 10, in which the amplified incoming signal is converted into an intermediate frequency (IF) by being mixed with a signal from the PLL synthesizer 7. The intermediate frequency signal is passed by a crystal filter 4 so that only a desired frequency band of the signal may be selected. The filtered signal is amplified and fed to a balanced detector 12 in which the signal is demodulated into an audio signal by being mixed with a signal from the carrier oscillator 8. The demodulated signal is amplified to a suitable level to drive a loud speaker (SP) by means of an audio amplifier 13. The PLL synthesizer 7 is provided with a variable resistor forming a clarifier or fine tuner for making the receiver frequecy equal to the frequency of the other transmitting station when the transceiver is in the receiving mode. If the receiver frequency is different from the transmitting frequency of the other station, the readability of the demodulated signal is low. Normally, the biasing voltage which is applied to a voltage controlled oscillator of the PLL synthesizer 7 is adjusted by manually operating the variable resistor so that the receiver frequency is made equal to the incoming frequency. This operation is well known as zero-beat operation.

The frequency shift due to mechanical and environmental changes is on the order of 1000 Hz in conventional transceivers. Thus, in SSB operation a receiver frequency adjusting device is essential. However, this device makes transceiver operation difficult and driving unsafe if a car should be equipped with such a transceiver. Furthermore, owing to this troublesome operation, transceiver operators prefer typical AM to SSB modes so that interference problems will be minimal.

This in order to accomplish high readability SSB telecommunication without manually operating a frequency adjusting device such as a clarifier, the permissible frequency difference between stations may be in the order of ±25 to 50 Hz. This value is equal to 1/27–1/54 of frequency deviation in conventional transceivers. This requirement cannot practically be met by a typical CB transceiver, since the crystal oscillator is activated in a constant temperature bath.

SUMMARY OF THE INVENTION

According, it is a primary object of the present invention to provide an SSB transceiver which is not troubled by the above-noted problems.

It is another object of the present invention to provide an SSB transceiver which can be automatically tuned to an incoming signal frequency.

The above and other objects are accomplished in accordance with this invention by an SSB transceiver comprising means operable when the transceiver is in the transmission mode for superposing on the transmitted signal two pilot signals having frequencies differing by a predetermined amount and means for demodulating the two pilot signals from a received signal thereby to switch the manual adjustment of the receiver frequency into automatic adjustment in response to a signal representative of the frequency difference between the pilot signals. Means operable in the receiving mode produce a reference signal corresponding to one of the pilot signals and a phase comparator produces a control signal corresponding to the difference between reference signal and corresponding pilot signal. The output frequency of a local oscillator of a PLL frequency synthesizer is controlled by the control signal so that the transceiver which is in the receiving mode may be automatically tuned to the incoming signal frequency.

BRIEF DESCRIPTION OF THE DRAWINGS

Details of the invention will be further understood upon reference to the drawings, wherein:

FIGS. 1 and 2 are schematic block diagrams showing respective transmitter and receiver units of a conventional transceiver, FIGS. 3 and 4 are schematic block diagrams showing transmitter and receiver units of an SSB transceiver in accordance with one embodiment of the present invention, FIGS. 5 and 6 are schematic block diagrams showing respective transmitter and receiver units of another embodiment of the present invention.

DESCRIPTION OF THE PREFERRED EMBODIMENTS

Figure 7:
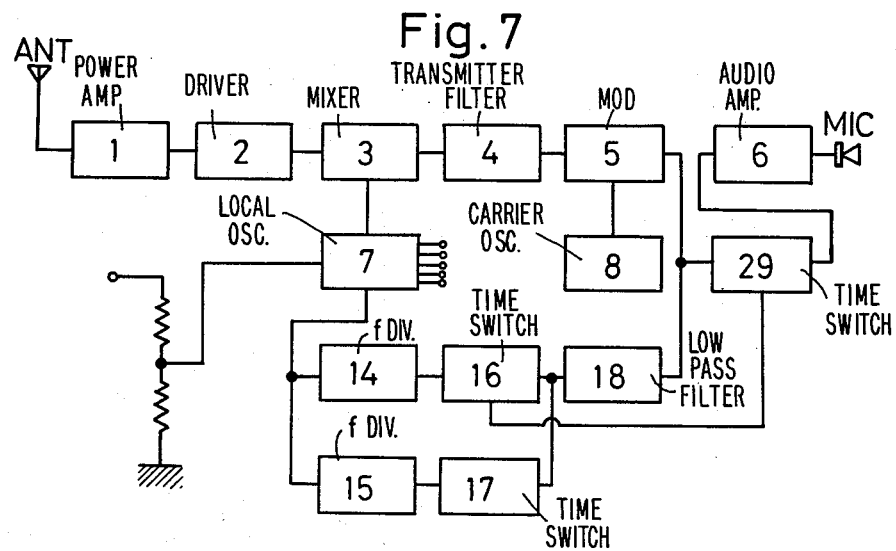
FIGS. 7 and 8 are schematic block diagrams showing respective transmitter and receiver units of yet other embodiments of the present invention.

Referring now FIG. 3, there is shown a transmitter unit which is operated when the transceiver of the present invention is in the transmission mode. The transmitter unit comprises a PLL synthesizer 7 and frequency dividers 14 and 15. A signal of 10 kHz which is generated from a reference oscillator of the PLL synthesizer 7 is applied to the frequency dividers 14 and 15 simultaneously. The signal is divided by 8 and 10 in the respective frequency dividers 14 and 15 and thus converted into two pilot signals of 1.25 kHz and 1 kHz in an audio band of 300 Hz to 3 kHz. The two pilot signals are input to time switches 16 and 17 respectively. The time switches 16 and 17 switch the receiving mode into the transmission mode and possess a time constant so that they pass the pilot signals for a desired period of time. If it is assumed that the time constants of time switches 16 and 17 are 0.8 and 0.3 seconds respectively, the two pilot signals of 1.25 and 1 kHz will pass through the time switch circuits 16 and 17 for 0.3 second after the transmission is initiated. The pilot signals are then input to a low pass filter 18 in which the harmonic waves are eliminated so that the signals are converted into sinusoidal waves. The filtered signals are superposed on an audio signal at the connection between the speech amplifier 6 and a balanced modulator 5. In the balanced modulator 5 a carrier signal from a carrier oscillator 8 is modulated with the audio signal on which the pilot signals have been superposed so that a carrier suppressed DSB signal is obtained. The DSB signal is converted into an SSB signal by a crystal filter 4 and the SSB signal is applied to a transmitter mixer 3.

In the transmitter mixer 3 the SSB signal is frequency converted into a desired transmitting frequency by mixing with a signal from the PLL synthesizer 7. The output signal from the balanced mixer 3 is preamplified by a driver amplifier 2 and then power amplified by a power amplifier 1 into a required power so that it is transmitted from an antenna.

Description will now be made with reference to FIG. 4 when the transceiver is in the receiving mode. An incoming signal into the antenna is amplified by a radio-frequency amplifier 9 and then input to a mixer 10 in which the amplified incoming signal is frequency converted into an IF frequency (intermediate frequency) by mixing with a signal from the PLL synthesizer 7. The IF signal is passed by the crystal filter 4 so that only a desired frequency band is passed. The filtered signal having the desired frequency band is amplified by an IF amplifier 11 and then input to a balanced detector 12.

In the balanced detector 12 the incoming SSB signal is demodulated into an audio signal including the pilot signals by mixing with a carrier signal from the carrier oscillator 8. The audio signal is amplified by an audio amplifier 13 for the purpose of driving a loud speaker, while the demodulated pilot signals, which were sent just after the initiation of transmission by the other station, are amplified by a low frequency amplifier 19 and then input to a phase detector 20 and detector 24. The detector 24 possesses a low pass filtering characteristic in which frequencies higher than 300 Hz are cut off. The detector 24 passes a signal having a frequency of 250 Hz which is the difference between two pilot signals sent for 0.3 second after the transmission is initiated by the other station. Even if there is a shift in frequency between the pilot signal and audio signal from when these signals have been superposed by the other station, the two demodulated incoming pilot signals are frequency shifted such that the frequency difference therebetween remains the same. Therefore, the frequency difference between the two pilot signals is always 250 Hz.

Only the 250 Hz signal is amplified by a low frequency filter 25 having an amplification function and input to a flip-flop 26. When the signal is input to the flip-flop 26, the output of the flip-flop is inverted and the inverted condition of the output is maintained even though the input signal is discontinued 0.3 second later.

The output of the flip-flop 26 is applied to a switching circuit 23 so the PLL synthesizer 7 is switched from manual adjustment of the output frequency thereof to automatic adjustment.

The 250 Hz signal which is superimposed on the audio signal is demodulated and applied to the phase detector 20 in which the incoming demodulated 1.25 kHz pilot signal is phase compared with a 1.25 kHz reference signal applied to the phase detector 20 and which can be obtained from dividing the signal obtained from the reference oscillator of the PLL synthesizer 7 by 8 in frequency divider 14. When the frequency of the signal transmitted by the other station is equal to that of the receiver, the frequency of the demodulated pilot signal is 1.25 kHz and no output signal is obtained from the phase detector 20, whereby the PLL synthesizer 7 continues to operate at the same frequency.

When the frequency of the signal transmitted by the other station is different from the receiver frequency, the frequency of the demodulated pilot signal is shifted by a frequency equal to the difference between the transmitted signal frequency and the receiver frequency and the phase detector 20 generates a control signal having a voltage corresponding to the frequency difference, and a discriminating signal representative of the error. The two signals are applied to a switching circuit 21 so that the discriminating signal activates the switching circuit 21 and the control signal is applied through the switching circuit 21 onto an active low pass filter 22 in which any undesired signals are eliminated. The filtered control signal is applied to the PLL synthesizer 7 through a switching circuit 23. The PLL synthesizer 7 includes an oscillator the output frequency of which is responsive to the voltage of its input. This oscillator is controlled in response to the control signal and generates an output whose frequency changes correspondingly with the control signal such that the receiver frequency will be made equal to the transmitted signal frequency. Once both signal frequencies in the phase detector are equal to each other, the control signal ends and the PLL synthesizer 7 continues to generate at the frequency then present.

The switching circuit 21 is turned on until the receiver frequency is made equal to the transmitted signal frequency. Thereafter the switching circuit 21 is turned off to terminate the operation by inversion of the discriminating signal. The activation time of the switching circuit 21 is selected to be shorter than the reception time of the pilot signals. The active low pass filter 22 is adapted to function at a constant frequency for a long period of time so that a constant DC voltage is continuously applied to the PLL synthesizer 7.

As mentioned above, the automatic tuning circuitry for zero-in operation functions when 1.25 kHz and 1 kHz pilot signals are received by the transceiver. However, it does not function when a single frequency pilot signal is received or when interference signals, such as two signals, are received and the frequency difference of which is not equal to 250 Hz. Manual adjustment of the receiver frequency by a variable resistor adjusting the voltage controlled oscillator of the PLL synthesizer is possible for accomplishing the zero-beat operation in response to a signal transmitted by a conventional transmitter which cannot generate pilot signals.

The transmitter and receiver units of an alternative embodiment of the present invention are shown in FIGS. 5 and 6, wherein like reference numerals refer to similar elements. The differences between the first and second embodiments will be described. With reference to FIG. 5, low frequency oscillators 27 and 28 are adapted to generate respective 1250 Hz and 1000 Hz pilot signals which will be superposed on an audio signal. When the transmitter is in the receiving mode, a demodulated 1250 Hz pilot signal and the output signal from the low frequency oscillator 27 are input to the phase detector 20 in which they are phase compared. In this embodiment, the output from the reference frequency oscillator of the PLL synthesizer 7 is not frequency divided and an additional oscillator is provided to produce the 1250 Hz signal.

A third embodiment is shown in FIG. 7 wherein like reference numerals again refer to similar elements. The difference between the third and the first embodiments will be described. There is shown a transmitter unit which is operated only when the transceiver is in the transmission mode. The audio signal which has been amplified by the speech amplifier 6 is applied to the balanced modulator 5 through the time switch 29. The time switch 29 is adapted to operate in synchronization with the time switch 16 for squelching the audio signal while a pilot signal is superposed on the audio signal. Thus the transceiver may be prevented from malfunction due to external noise which can be picked up by a microphone.

Figure 8:
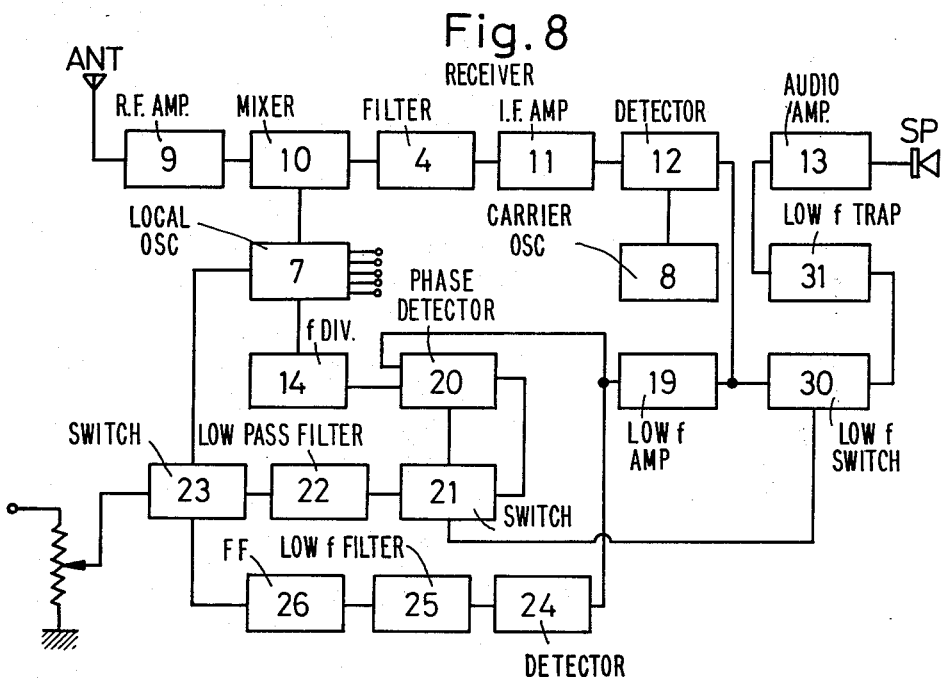

The difference between a fourth embodiment shown in FIG. 8, again wherein like reference numerals refer to similar elements, and the first embodiment will be described. There is shown a receiver unit which is operated only when the transceiver is in the receiving mode. A low frequency switch 30 and a low frequency trap 31 are provided between the balanced modulator 12 and the speech amplifier 13. The low frequency switch 30 functions in synchronization with the phase comparator 20 and is controlled by the discriminating signal from the phase comparator 20. The low frequency switch is turned off when the transmitted signal frequency is not equal to the receiver frequency and is turned on when both signals are equal. The demodulated signal is applied through the low frequency switch 30 onto a low frequency trap in which only the 1250 Hz pilot signal is eliminated. The low frequency switch 30 is adapted to turn on or off in synchronization with the switching circuit 21. In a conventional manner, the low frequency switch 30 is rendered on although the incoming signal contains no pilot signals.

In order to make the receiver frequency equal to the incoming signal frequency adjustment has heretofore been accomplished manually. However, in accordance with the present invention, high readability telecommunication can be accomplished by superposing pilot signals onto an audio signal to be transmitted. Furthermore, an SSB transceiver may be provided which is operated in a simple manner, and crystal oscillators having very low frequency drift are not necessary.

An additional low frequency trap may be provided for preventing the leakage of pilot signals from the loud speaker if desired. A time switch may be provided at the receiver unit for cancelling the audio signal when the pilot signals are transmitted at the beginning of the transmission. While the principles of the present invention have been hereabove described in relation with specific embodiments, it must be clearly understood that the said description has only been made by way of example and does not limit the scope of this invention.

What is claimed is:

1. In an SSB transceiver having a transmission mode and a receiving mode, comprising tuning means operable in said receiving mode for adjusting the frequency of a received signal, said tuning means including an oscillator having a variable output frequency which is manually adjustable, the improvement comprising means for producing two pilot signals having frequencies differing by a predetermined amount, means operable in said transmission mode for superposing said pilot signals on a transmitted signal, means operable in said receiving mode for demodulating such pilot signals from a received signal, means operable in said receiving mode for switching said tuning means from a manual operating mode to an automatic operating mode in response to a signal having a frequency equal to the predetermined frequency difference between said two pilot signals, means operable in said receiving mode for producing a reference signal having a frequency corresponding to one of said pilot signals, and means operable in said receiving mode for comparing the phases of said reference signal and the corresponding pilot signal demodulated from said received signal and producing a control signal corresponding to the difference between said compared signals, and means supplying said control signal to said oscillator to vary the output frequency thereof, whereby said tuning means will be activated automatically by said control signal.

2. An SSB transceiver is defined in claim 1 in which said oscillator comprises a phased-lock frequency synthesizer.

3. An SSB transceiver as defined in claim 1 comprising a reference oscillator producing a signal which is frequency divided to produce said pilot signals.

4. An SSB transceiver as defined in claim 1, comprising means for blocking the received signal from an audio output unless said reference signal frequency equals said corresponding pilot signal frequency.

5. An SSB transceiver as defined in claim 1, said two pilot signals each having a frequency in an audio band of 300 Hz to 3 kHz.

6. An SSB transceiver as defined in claim 1, comprising two low frequency oscillators each producing a respective pilot signal.

7. An SSB transceiver as defined in claim 6, one of said low frequency oscillators also produces said reference signal when in the receiving mode.

8. An SSB transceiver as defined in claim 1, comprising timing means for limiting said pilot signals for a short time period from the start of transmission of said transmitted signal.

9. An SSB transceiver as defined in claim 8, said two pilot signals each having a frequency in an audio band of 300 Hz to 3 kHz.

10. An SSB transceiver as defined in claim 8, comprising means operating in synchronization with said timing means for squelching during said pilot signals an audio signal normally forming a part of said transmitted signal.

11. An SSB transceiver as defined in claim 10, said two pilot signals each having a frequency in an audio band of 300 Hz to 3 kHz.

* * * * *